(12) United States Patent
Bruynsteen

(10) Patent No.: US 6,658,663 B1
(45) Date of Patent: Dec. 2, 2003

(54) BUSINESS MODEL FOR LEASING STORAGE ON A DIGITAL RECORDER

(75) Inventor: Geert Frank Bruynsteen, Los Altos, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/521,051

(22) Filed: Mar. 8, 2000

(51) Int. Cl.[7] .......................... H04N 7/16; H04N 7/173; H04N 7/26; H04N 5/781
(52) U.S. Cl. .......................... 725/134; 725/5; 725/132; 386/112; 386/124
(58) Field of Search .................. 725/1, 5, 134, 725/142, 132, 140; 386/1, 45, 46, 125–126, 109–112, 124

(56) References Cited

U.S. PATENT DOCUMENTS

| | | | | | |
|---|---|---|---|---|---|
| 5,909,238 A | * | 6/1999 | Nagashima et al. | ........... | 725/5 |
| 6,012,088 A | * | 1/2000 | Li et al. | ...................... | 709/219 |
| 6,047,128 A | * | 4/2000 | Zander | ........................ | 717/173 |
| 6,157,377 A | * | 12/2000 | Shah-Nazaroff et al. | ....... | 725/1 |
| 6,345,388 B1 | * | 2/2002 | Nishio et al. | .................. | 725/93 |
| 6,374,406 B2 | * | 4/2002 | Hirata | ........................ | 725/132 |
| 6,532,593 B1 | * | 3/2003 | Moroney | ..................... | 725/142 |
| 2001/0047516 A1 | * | 11/2001 | Swain et al. | .................. | 725/86 |
| 2002/0046407 A1 | * | 4/2002 | Franco | ........................ | 725/110 |

FOREIGN PATENT DOCUMENTS

| EP | 0266135 A2 | 5/1988 |
|---|---|---|
| EP | 0751685 | 1/1997 |
| EP | 0785686 | 7/1997 |

* cited by examiner

*Primary Examiner*—John Miller
*Assistant Examiner*—Scott Beliveau
(74) *Attorney, Agent, or Firm*—Michael Schmitt

(57) ABSTRACT

The available amount of storage space of a fixed HDD on a CE device is adjustable via a data network. The consumer can upgrade the device via a third party service that remotely control's the HDD's settings.

4 Claims, 2 Drawing Sheets

BUSINESS MODEL FOR LEASING STORAGE ON A DIGITAL RECORDER

FIELD OF THE INVENTION

The invention relates in particular, but not exclusively, to a consumer electronics (CE) apparatus with a storage, e.g., a hard-disk drive (HDD), an optical disk drive (ODD), or a solid state memory for storing content information, such as audio or video.

The invention also relates to providing a service relating to the processing of the content information local at the end-user's equipment.

BACKGROUND ART

A digital video recorder (DVR), also referred to as Personal Video Recorder (PVR) uses a HDD to store digital content information received via satellite, terrestrial or cable communication channels. The digital format allows the information to be processed under software control regardless of the platform. Decoding, error correction and format conversion have become standard operations. The play-out and recording of content informants has become user-programmable through electronic program guides (EPG's) or software agents. The content information received through a live broadcast, e.g., via a TV channel or via the Internet can be time-shifted, time-warped, and edited through this recording equipment. An example of such equipment is the PVR system developed by TiVo™ and manufactured and marketed by Philips Electronics.

The TiVo™ system currently comes with a HDD that has a storage capacity of 13.6 GB or 27.2 GB that enables the consumer to store 14 or 30 of video, respectively. The TiVo™ system uses the MPE(-2 compression algorithm that permits a range of different video-quality settings. The user can adjust the settings accordingly to four quality levels. At the highest setting the quality is that of the near-DVD level. At the lowest setting, the quality is comparable to that of a VHS tape. The 14-hour PVR is able to record 14 hours at the lowest quality, and 4 hours at the highest quality setting.

SUMMARY OF THE INVENTION

The physical storage capacity of a specific HDD is fixed. To upgrade a PVR to a larger storage capacity requires the PVR to be sent to a dealer or to the manufacturer for replacing the HDD with a larger one. This means that the end-user has to disconnect the apparatus from the power lines and from home network, bring it or have it shipped to the site that does the upgrading, pick it up or receive it from Within this context the inventor therefore proposes to upgrade the storage capacity in a manner that does not require the apparatus to be disconnected from the home network, shipped, etc. The Inventor proposes a business model wherein the apparatus has already got a relatively large HDD when acquired by the end-user, but whose capacity is controllable through software. The range determines which area(s) of the disk are accessible for reading or writing. Alternatively or combinatively, different compression algorithms are selected through software so as to determine the time available for recording. The upgrade is now obtained through replacing or adjusting the software from a server, e.g., via the Internet, upon the user paying a fee. Alternatively, the software upgrade can be leased temporarily or made part of, e.g., a video-on-demand service or audio-on-demand service.

Accordingly, the end-user is given the advantage of a simple upgrade. The manufacturer or dealer is given the advantage that upgrades are far less time-consuming and can be done automatically via the Internet. In addition, identical apparatus can be manufactured and offered for sale for different prices depending on the software control of the HDD's storage space.

The invention allows a method of doing business by leasing or selling storage capability for, e.g., for recording video or audio via a data network such as the Internet.

What has been explained above with regard to HDD-based storage capabilities is also applicable, mutatis mutandis, to storage provided by, e.g., solid state memories or storage provided by a recordable optical disks. For example, the storage capacity is segmented and access to one or more segments is determined by software under control of, or upgradeable by, the manufacturer or the dealer or the content provider. Similarly, various compression algorithms associated with respective upgrades can be remotely enabled by the manufacturer, the dealer or the content provider. As an alternative, a data format of the content information is adjustable while the information is being stored, e.g., by selectively clipping one or more of the least-significant bits per word or byte.

In a more general sense, the invention relates to a method of enabling an end-user to locally process content information on his or her information-processing system, e.g., a CE audio/video system or a home theater. The quality level of the processing is remotely adjustable by a service provider. For example, the end-user obtains a higher quality of the processing in return for a higher fee. Preferably, the quality is adjustable via a data network, such as the Internet. The end-user's information-processing system comprises an apparatus for this local processing, e.g., a set-top box, a convergence product such as the DVX8000 of Philips Electronics or another home theater control system or a PTV. The apparatus has a data network capability for the remote adjusting, e.g., it has Internet access. For example, the local processing comprises the playing out of audio or video content information; and the quality level of the playing out is remotely adjustable by the service provider, dependent on, e.g., a subscription fee. The quality of the playing out of the digital audio or video content can be controlled by, for example, the extent of the clipping of the digital words by selectively discarding one or more of the least significant bits in the digital to analog conversion, or by adding noise or by removal of previously added noise, etc.

Especially with regard to the rapidly increasing retrieval of content information from the Web and the seemingly unlimited distribution capabilities of the Internet at the expense of, e.g., the authors and other copyright owners, a remotely controlled play-out quality may have attractive aspects for all parties involved.

In case the local processing comprises locally storing the content information the quality of the storing can be made remotely adjustable by the service provider, for example by regulating a storage capacity available to the end-user. This can be done, as explained earlier by providing end-user access to a selected portion of a local storage. If the local storage comprises a HDD or an ODD the storage capacity is regulated by controlling a range of travel of a mechanical component, e.g., the swing arm, of the HDD.or ODD. If the local storage comprises a solid state memory the storage capacity can be regulated by controlling an address range of the memory.

Alternatively, or in addition, the regulating of the storage capacity may comprise controlling a data format of the content information during the local storing. The clipping has been mentioned above. Another example is the use of different encryption or compression algorithms for writing the data to the storage. Some provide a higher play-out quality (e.g., CD-like quality) than others (e.g., MP3-like quality). The algorithms are present at the end-user's equipment and can be selectively enabled by a remote server communicating with the equipment under control of the service provider.

In a business model, content information is made available via the Internet together with, or separately from, the software for play out decoders or controllers in case of the remotely adjustable rendering. In a business model, content information is made available via the Internet together with, or separately from, the software for the software for the storage decoders or storage controllers in case of the remotely adjustable storage capacity. The software can be tied to the specific information content, e.g., by a common time stamp or a unique combination of IDs. The decoders or controllers for the higher quality are, for example, only valid on a certain machine or during a predetermined time interval and for a higher fee.

BRIEF DESCRIPTION OF THE DRAWINGS

The invention is explained by way of example and with reference to the accompanying drawings, wherein.

Throughout the figures, same reference numerals indicate similar or corresponding features.

DETAILED EMBODIMENTS

Figure 1:
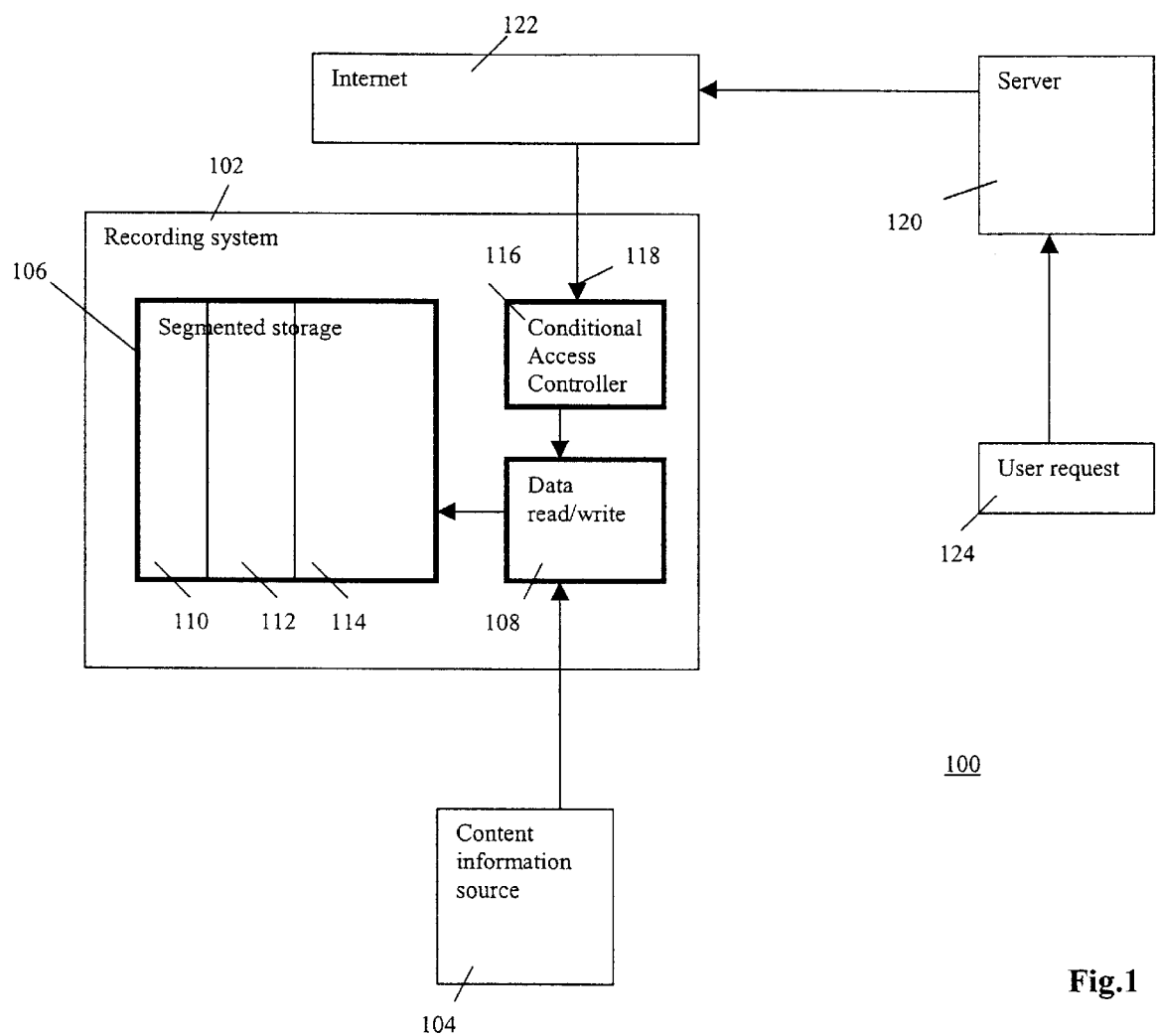
FIGS. 1 and 2 are block diagrams of systems in the invention.

FIG. 1 is a block diagram of a first system 100 in the invention. System 100 comprises a CE equipment or apparatus 102 that includes a data recording functionality. A source 104 supplies content information in a digital format, such as audio or video, to apparatus 102. Apparatus 102 has a data storage 106 for recording the content information via a data read/write unit 108. Unit 108 is also used for reading the data stored for play-out. Storage 106 has a fixed storage capacity that is divided into multiple segments 110, 112, and 114. A conditional access controller 116 determines which of segments 110, 112, and 114 is or are accessible to read/write unit 108. Controller 116 has an input 118 for receiving control data for setting an access mode of recording system 102. In the illustrated example, controller 116 controls reed/write until 108 through, e.g., selectively controlling the address range of the address decoder (not shown) of unit 108. Alternatively or in addition, controller 116 disables or enables address bits on or more inputs to storage 106, or selects one of multiple compression algorithms for writing the content Information to storage 106. Apparatus 102 has these algorithms installed preferably beforehand. Different algorithms need different amounts of memory space to store the initially the same content; Controller input 118 receives the control data from a server 120 via a data network 122, e.g., the Internet. The control data regulate the storage space or segment(s) available to the end-user, or the efficiency of the storing via the selected algorithm.

Server 120 in this example is under control of the manufacturer or supplier of apparatus 102. For a higher price or higher fee, the end-user purchases or leases apparatus 102 with effectively a higher storage capacity. Upgrades are easily implemented later on upon a user request 124 sent to server 120, together with an authorization for an additional payment made to the supplier or service provider.

User request 124 is sent via apparatus 102 or another suitable device, e.g., a set-top box or a PC with Internet access. Alternatively, the user can dial in to the server and state his/her preferences via, e.g., a touch-tone driven menu.

The content information can, but need not, be provided by the same service provider, who controls the adjusting of the storage space available to the end-user. For example, a scenario is feasible wherein the service provider controls both the available storage space and the supply of content information, e.g., via the Internet or via cable, the content information can be labeled in such a way as to automatically determine the effective size of the storage space available, either through selective access to segments 110, 112, and 114 or through specific compression algorithms. For example, upon downloading the content information in labeled partitions from source 104 (e.g., via server 120), the labels determine the compression algorithm and therefore the quality of the content Information as stored. As another example, the user sends a request for specific content information to the service provider and wants a suitable amount of temporary local storage space for recording the content information requested. The user pays a fee and the service provider enables access to a larger portion of storage 106 under appropriate control of controller 116. The user thus is allowed to temporarily access the stored content information, but on expiry of the lease time, read-access to the whole or parts of the content information as stored is denied or its content is overwritten via appropriate control of controller 116, either through commands or executing a software program local to apparatus 102 under control of the service provider.

In another scenario, the manufacturer or dealer provides the service of upgrading the storage space available to the end-user upon the latter's request. For example, the end-user submits a request for a larger storage, e.g., through email or via the telephone, connects apparatus to the Internet if it was not already connected, so that storage 106 can get remotely adjusted, and awaits a confirmation that adjustment is successfully completed, e.g., by an automatic visual indication (an LED, for example) generated at apparatus 102 itself under control of, e.g., controller 116.

Controller 116 and read/write unit 108 can be supplied as a secure module for preventing an unauthorized person tampering with its innards.

Figure 2:
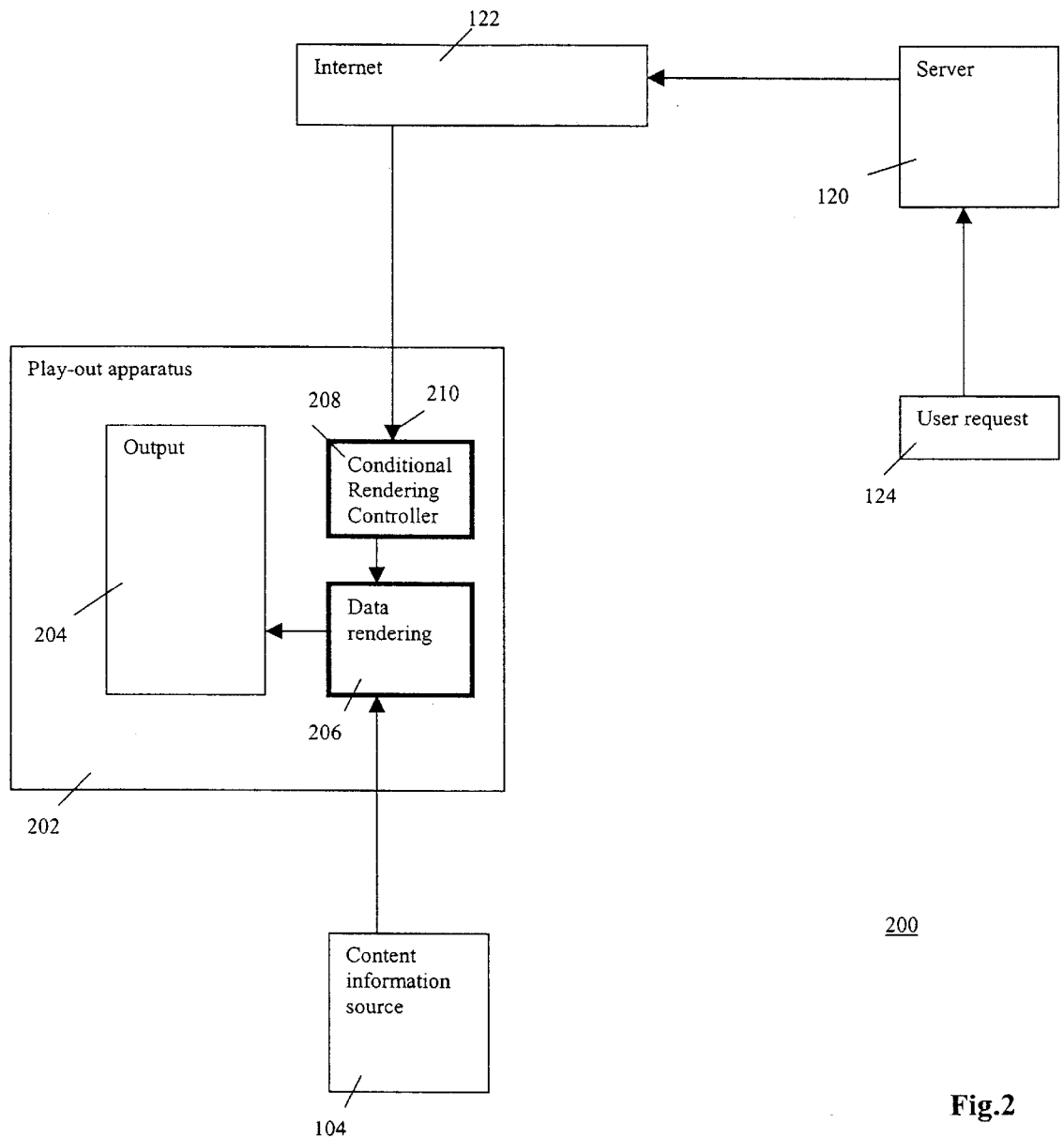

FIG. 2 is a block diagram of another system 200 in the invention. System 200 comprises a play-out apparatus 202, such as an audio player or a video player or an entire home theater. System 200 further comprises source 104 for supply of content information to apparatus 202 for subsequent play-out via an output 204 of apparatus 202. Output 206 comprises for example a display monitor or loudspeaker system. The content information from source 104 is processed by a rendering circuit 206 to make play out possible. Rendering circuit 206 is controlled via a controller 208 that conditionally regulates the rendering by circuit 206. Controller 208 has an input 210 connected to a server 120 on the Internet 122. Server 120 sets the rendering mode of rendering circuit 206 through controller 208 and via the Internet 122 upon request 124 from the end-user. For example, source 104 streams video data via cable or via the Internet 122 to apparatus 202. Controller 208 can be set through server 120 to be operational only for a certain period of time, e.g., to let the user get a preview or to permit watching the videos from source 104 for the duration of a subscription to be renewed periodically. In another scenario, the user can specify the resolution or color depth of the video to be rendered at output 204. The pixel depth indicates the number of different pixel values, e.g., different colors or different grey levels, that a particular pixel can assume. Upon paying a fee according to the quality level desired, circuit 206 processes the data under control of controller 208 that in turn got instructed via server 120. In yet another scenario, source 104 comprises a DVD with a unique identifier conditionally acceptable by rendering circuit 206 for processing. Server 120 instructs controller 208 according to the fee paid by the user and the business model applied to conditionally render the DVD. In this manner, the play-out quality can be controlled depending on what the end-user is willing to pay. Also, in a same model the user can be given conditional access to one or more segments of the content information stored on the DVD. In yet another scenario, the manufacturer can remotely upgrade the rendering quality in dependence on what the user wants to spend on apparatus. In still another scenario, various levels of play-out quality can be leased dependent on the type of content information supplied. For example, a recording of a sports match may require not so high a video play-out quality as, e.g., a modern movie. Resolution or color depth can be regulated by, e.g., clipping the bits.

Controller 208 may be part of a PC or a dedicated embedded processing system or graphics processor for providing the processing power that is adequate to handle the video data for the purpose of regulating the resolution or color depth.

Again, source 104 and server can be controlled by the service provider, or can alternatively be stages in a distributed commerce system.

The invention provides a manner to better control copyright protection.

The expressions "service provider", "manufacturer" and "dealer" have been used herein to indicate in general, within the relevant context, the third party under whose supervision the quality level is remotely adjusted of the processing of the content information carried out locally at the end-user's equipment.

Incorporated herein by reference are the following patent documents:

U.S. Ser. No. 09/519,546 (attorney docket PHI-US 000014) filed Mar. 6, 2000 for Frederick Elkkel et al., for PERSONALIZING CE EQUIPMENT CONFIGURATION AT SERVER VIA WEB-ENABLED DEVICE. This document relates to the configuring of CE equipment by the consumer. The setting up of the configuration is facilitated by means of delegating the configuring to an application seer on the Internet. The consumer enters his/her preferences In a specific Interactive Web page through a suitable user interface of an Internet-enabled device, such as a PC or set-top box or digital cellphone. The application server generates the control data based on the preferences entered and downloads the control data to the CE equipment itself or to the Internet-enabled device.

U.S. Ser. No. 09/160,490 (attorney docket PHA 23,500) filed Sep. 25, 1998 for Adrian Turner et al., for CUSTOMIZED UPGRADING OF INTERNET-ENABLED DEVICES BASED ON USER-PROFILE. This document relates to a SmartConnect (TM) server system that maintains a user profile of a particular end-user of consumer electronics network-enabled equipment. The server also maintains a data base of new technical features for this type of equipment. If there is a match between the user-profile and a new technical feature, and the user indicates to receive information about updates or sales offers, the user gets notified via the network of the option to obtain the feature.

U.S. Ser. No. 09/189,535 (attorney docket PHA 23,527) filed Nov. 10, 1998 for Eugene Shteyn for UPGRADING OF SYNERGETIC ASPECTS OF HOME NETWORKS. This document relates to a server that has access to an inventory of devices and capabilities on a user's home network. The inventory is, for example, a look-up service as provided by HAVi or Jini architecture. The server has also access to a data base with information of features for a network. The server determines if the synergy of the apparatus present on the user's network can be enhanced based on the listing of the inventory and on the user's profile. If there are features that are relevant to the synergy, based on these criteria, the user gets notified.

U.S. Ser. No. 09/349,676 (attorney docket PHA 23,681) filed Jul. 8, 1999 for Kristen Ondeck for AFTER-SALES CUSTOMIZATION SPECIFIED BY RETAILER ACTS AS INCENTIVE. This document relates to a method of doing business that enables to stimulate commercial activities. A customer notifies a manufacturer or a dedicated service provider, of the purchase of merchandise from a specific retailer. Upon being notified, the manufacturer or service provider customizes a portal or home page for the customer by temporarily adding an advertisement banner associated with the retailer.

U.S. Ser. No. 09/283,545 (attorney docket PHA 23,633) filed Abr. 1, 1999 for Eugene Shteyn for TIME- AND LOCATION-DRIVEN PERSONALIZED TV. This document relates to a method of enabling a user to access content information (e.g., video, audio). The method enables the user to select the content information, e.g., from an electronic program guide relating to a broadcast or multicast service. The selected content information gets recorded when it is broadcasted or multicasted. The method enables the user to select in advance at least a specific one from multiple geographically different locations at which the recorded, selected content information will be made available for play-out. Preferably, the invention also enables the user to specify a time frame for making the recorded content information available for play-out at the specific location. The content information can be recorded at a first recording system, e.g., at a server, whereafter the recorded selected content information is streamed over a data network, e.g., over the Internet or a private network like AOL, from the first recording system to the location specified by the user. If the specific location has a second recording system, the streaming uses a low-bandwidth protocol so as to keep Internet bandwidth usage low while recording at the second recording system. Accordingly, this method lets the user specify in advance a location for play-out of a specific broadcast or multicast program pre-recorded in response to the user's selection, and has the content made available to him or her at that location. For example, the user can specify that he or she will be, e.g., at the house of a relative, at a specific hotel, on a particular flight of a specific airline, in a specific bar, a particular restaurant, etc., at a specific time period, and request that the content be recorded at this location. This requires that these other locations be integrated in the infrastructure of the service mentioned above. The programs of a TV broadcasts are typically regional or local. If the user is traveling outside the region or the time zone, he or she may request to search for an identical program broadcasted in the new region, or a program of a similar content, or a program with identical or similar content but closer in time to the intended play-out, and record that program at a recording device in the pre-specified location.

U.S. Ser. No. 08/987,696 (attorney docket PHD 96,199), now allowed, and filed Dic. 9, 1997 for Wolfgang Zander for SYSTEM FOR DOWNLOADING SOFTWARE. This document relates to a system for replacing old software resident on an apparatus by new software via e.g., the Internet. The system has a control circuit and a storage device for storing the software. The system has a loading device for delivering the new software to the storage device. The control circuit stores the new software in the storage device after reception of an appropriate instruction. The new software comprises system software, at least consisting of operating software and downloading software. The new software also comprises new application software for controlling a component coupled to the module. During operational use of the component a first part of the storage device stores the new system software and a second part of the storage device stores the new application software. During the downloading of the new system software the control circuit erases the first part of the storage device, after the storage of the new system software in the second part of the storage device. The control circuit transfers subsequently the new system software from the second part to the first part of the storage device.

What is claimed is:

1. A method of enabling an end-user to locally process content information at a quality level remotely adjustable by a service provider, wherein:

the local processing comprises locally storing the content information; and the quality of the storing is remotely adjustable by the service provider, and wherein the adjusting of the quality of the storing comprises regulating a storage capacity available to the end-user, and wherein the regulating of the storage capacity comprises providing end-user access to a selected portion of a local storage.

2. The method of claim 1, wherein:

the local storage comprises a HDD; and the storage capacity is regulated by controlling a mechanical component of the HDD.

3. The method of claim 1, wherein:

the local storage comprises a solid state memory; and the storage capacity is regulated by controlling an address range of the memory.

4. The method of claim 1, wherein:

the local storage comprises an ODD; and the storage capacity is regulated by controlling a mechanical component of the ODD.

* * * * *